United States Patent
Kuriki (10) Patent No.: US 9,636,964 B2
(45) Date of Patent: May 2, 2017

(54) DAMPER

(71) Applicant: HONDA MOTOR CO., LTD., Tokyo (JP)

(72) Inventor: Nobuharu Kuriki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/835,995

(22) Filed: Aug. 26, 2015

(65) Prior Publication Data

US 2016/0059658 A1 Mar. 3, 2016

(30) Foreign Application Priority Data

Aug. 28, 2014 (JP) ................. 2014-174116

(51) Int. Cl.
*B60G 13/14* (2006.01)

(52) U.S. Cl.
CPC .......... *B60G 13/14* (2013.01); *B60G 2202/24* (2013.01); *B60G 2202/416* (2013.01); *B60G 2204/62* (2013.01); *B60G 2206/41* (2013.01); *B60G 2300/60* (2013.01); *B60G 2400/91* (2013.01); *B60G 2500/10* (2013.01); *B60G 2600/188* (2013.01); *B60G 2600/21* (2013.01); *B60G 2800/162* (2013.01)

(58) Field of Classification Search
CPC .................................... B60G 13/14
USPC ........................................ 290/1 R
See application file for complete search history.

(56) References Cited

U.S. PATENT DOCUMENTS

| 4,295,538 | A | * | 10/1981 | Lewus | B60G 13/14 180/165 |
| 5,337,560 | A | * | 8/1994 | Abdelmalek | B60G 13/14 180/65.25 |
| 5,570,286 | A | * | 10/1996 | Margolis | B60G 13/14 180/165 |
| 2004/0150361 | A1 | * | 8/2004 | Hio | B60G 17/0165 318/375 |
| 2007/0089924 | A1 | * | 4/2007 | de la Torre | B60G 13/14 180/305 |
| 2008/0257626 | A1 | * | 10/2008 | Carabelli | B60G 13/14 180/165 |

(Continued)

FOREIGN PATENT DOCUMENTS

| JP | 2004-237824 A | 8/2004 |
| JP | 2007-233985 A | 9/2007 |

(Continued)

OTHER PUBLICATIONS

Japanese Office Action dated Jan. 12, 2016 (mailing dated), issued in related Japanese Patent Application No. 2014-174116.

*Primary Examiner* — Tulsidas C Patel
*Assistant Examiner* — Charles Reid, Jr.
(74) *Attorney, Agent, or Firm* — Westerman, Hattori, Daniels & Adrian, LLP (57) ABSTRACT

A damper includes a polarized capacitor electrically connected to an electromagnetic motor. The surface area at a first fluid chamber side of a piston head is different from the surface area at a second fluid chamber side of the piston head in a cylinder. A positive electrode side of the polarized capacitor is connected to the electromagnetic motor at a side at which output voltage from the electromagnetic motor is positive when the piston head is displaced toward the first fluid chamber side.

4 Claims, 9 Drawing Sheets

(56) References Cited

U.S. PATENT DOCUMENTS

| | | | | |
|---|---|---|---|---|
| 2010/0066051 A1* | 3/2010 | Haugen | ............... | B60G 13/14 |
| | | | | 280/124.157 |
| 2014/0190156 A1* | 7/2014 | Reybrouck | ........... | B60G 15/08 |
| | | | | 60/431 |
| 2016/0114643 A1* | 4/2016 | Anderson | ............. | B60G 13/14 |
| | | | | 188/314 |

FOREIGN PATENT DOCUMENTS

| JP | 2009-106105 A | 5/2009 |
|---|---|---|
| JP | 2009-148149 A | 7/2009 |

\* cited by examiner

DAMPER

CROSS REFERENCES TO RELATED APPLICATIONS

The present application claims priority under 35 U.S.C. §119 to Japanese Patent Application No. 2014-174116, filed Aug. 28, 2014, entitled "Damper." The contents of this application are incorporated herein by reference in their entirety.

BACKGROUND

1. Field

The present disclosure relates to a damper that regenerates the energy of input vibration.

2. Description of the Related Art

Japanese Unexamined Patent Application Publication No. 2004-237824 discloses a vehicle electromagnetic suspension apparatus that is capable of passively addressing inputs not to be controlled while actively controlling inputs to be controlled (hereinafter referred to as "target inputs") and that is capable of not only simplifying the active control but also improving energy efficiency (paragraph [0005] and Summary).

In order to achieve the above objects, the vehicle electromagnetic suspension apparatus disclosed in Japanese Unexamined Patent Application Publication No. 2004-237824 includes an electromagnetic actuator 4 and a motor controller 17 (Summary and FIG. 3). The electromagnetic actuator 4 is placed in parallel with a spring element 7 between the sprung and the unsprung and is driven by an electric motor 8. The motor controller 17 calculates a displacement input into the electromagnetic actuator 4 and controls the electric motor 8 so as to generate optimal damping force corresponding to the displacement input. An electrical damping element (an electrical resistor 20 or an electrical resonant circuit 21) is connected to a control circuit in the electric motor 8 in parallel with the electric motor 8 (Summary, FIG. 4, and FIG. 7). The electrical damping element passively generates the damping force through power generation damping in the electric motor 8 against the displacement input from the unsprung. The electric motor 8 generates (regenerates) power in response to rotation of a ball screw 9 in association with the displacement of a ball screw nut 10 involved in the displacement input from the unsprung (FIG. 2).

Of the electrical damping elements, the electrical resonant circuit 21 (FIG. 7) is composed of a resistor R, a coil L, and a capacitor C in which a resonant frequency is made equal to an unsprung resonant frequency (for example, 10 Hz to 20 Hz) (paragraph [0045]). With this configuration, Japanese Unexamined Patent Application Publication No. 2004-237824 indicates that both the effective active control for the target inputs within a low frequency band including a sprung resonant frequency and the effective passive control for the target inputs near the unsprung resonant frequency, which is the resonant frequency, are achieved (paragraph and FIG. 9). The active control here is current control of the electric motor 8 intended for low-frequency vibration control including orientation control (paragraph [0037]).

As described above, in Japanese Unexamined Patent Application Publication No. 2004-237824, the target inputs within the low frequency band including the sprung resonant frequency are subjected to the active control using the current control of the electric motor 8. The target inputs near the unsprung resonant frequency are subjected to the passive control using the electrical resonant circuit 21 including the resistor R, the coil L, and the capacitor C.

When the electrical resonant circuit 21 is operated in the passive control, the orientation of output current from the electric motor 8 is continuously varied. In this case, although deterioration of the capacitor C may be accelerated if a polarized capacitor is used as the capacitor C, this problem is not considered in the Japanese Unexamined Patent Application Publication No. 2004-237824.

SUMMARY

It is desirable to provide a damper capable of suppressing deterioration of a capacitor.

The present application describes a damper including a damper body that includes a cylinder, a piston head with which an interior of the cylinder is divided into a first fluid chamber and a second fluid chamber, and a piston rod one end of which is fixed to the piston head and which is disposed at the second fluid chamber side; a communicating path via which the first fluid chamber communicates with the second fluid chamber outside the cylinder; a fluid pump provided on the communicating path; an electromagnetic motor that generates damping force to a spring by regenerating the energy of oscillation input through the fluid pump; and a capacitor electrically connected to the electromagnetic motor. The capacitor is a polarized capacitor. The first surface area at the first fluid chamber side of the piston head is different from the second surface area of the second fluid chamber side of the piston head as each "surface area" is defined by its area being in contact with the fluid filled in each chamber. In one embodiment, for example, the second surface of the piston head may have the reduced "surface area" due to the piston rod connected to the second surface, while the first surface may have the larger "surface area" than the second surface area. A positive electrode side of the capacitor is connected to the electromagnetic motor at a side at which output voltage from the electromagnetic motor is positive when the piston head is displaced toward the first fluid chamber side. In another aspect, a vehicle including the damper described in the present application is provided.

According to the present disclosure, in the piston head, the surface area of the first fluid chamber side at which the piston rod does not exist is different from the surface area of the second fluid chamber side at which the piston rod exists. Accordingly, the relationship between the amount of displacement of the piston head and the amount of change in the angle of rotation of the electromagnetic motor is capable of being varied in accordance with the direction in which the piston head is displaced.

Specifically, when the piston head is displaced toward the first fluid chamber side, the amount of change in the angle of rotation of the motor (the rotational speed of the motor) with respect to the amount of displacement of the piston head is capable of being increased. When the piston head is displaced toward the second fluid chamber side, the amount of change in the angle of rotation of the motor (the rotational speed of the motor) with respect to the amount of displacement of the piston head is capable of being decreased. Accordingly, when the piston head moves in the hydraulic cylinder, the amount of power generation when the piston head is displaced toward the first fluid chamber side is capable of being increased to cause positive deviation of the voltage of the capacitor. As a result, it is possible to easily suppress deterioration of the capacitor even when the polarized capacitor is used.

In the damper, an inductance of the electromagnetic motor and a capacitance of the capacitor may compose an LC resonant circuit. With this configuration, it is possible to protect the polarized capacitor because of the above action even when the LC resonant circuit is configured.

In the damper, input oscillation components corresponding to a sprung resonant frequency may be passively suppressed, in addition to input oscillation components corresponding to an unsprung resonant frequency, by setting an electrical resonant frequency identified by the inductance of the electromagnetic motor and the capacitance of the capacitor to a value within ±20% of the unsprung resonant frequency.

With the above configuration, it is possible to suppress the input oscillation components corresponding to the unsprung resonant frequency and the sprung resonant frequency without the active control of the electromagnetic motor.

Specifically, the inventor of the present disclosure has found that an effect (hereinafter referred to as a "negative spring effect") to reduce the input oscillation components corresponding to the sprung resonant frequency prominently appears in the force generated in the damper body functioning as an actuator when the electrical resonant frequency is set to the unsprung resonant frequency or a value near the unsprung resonant frequency (for example, a value within ±20% of the unsprung resonant frequency). Accordingly, the input oscillation components corresponding to the unsprung resonant frequency and the sprung resonant frequency are suppressed without the active control of the input oscillation components corresponding to the sprung resonant frequency by the motor, unlike Japanese Unexamined Patent Application Publication No. 2004-237824. Consequently, it is possible to improve the energy usage efficiency without consuming the power to suppress the input oscillation components corresponding to the sprung resonant frequency, rather by accumulating the power through the regeneration. The term "negative spring effect" is derived from an action opposite to that of the spring. The rationale of the negative spring effect will be described below.

In the damper, an electrical load may be connected to the capacitor. With this configuration, the power charged in the capacitor is discharged even in the configuration in which the voltage of the capacitor is subjected to the positive deviation. Accordingly, the capacitor is hard to be in a full-charge state, thereby easily keeping the performance of the damper.

The suspension apparatus including the damper described above is mounted in a vehicle in the present embodiment. Accordingly, it is possible to realize excellent damping performance without consuming the power of the vehicle for the damper.

According to the present disclosure, it is possible to suppress deterioration of the capacitor.

DESCRIPTION OF THE PREFERRED EMBODIMENTS

A. One Embodiment

Figure 1:
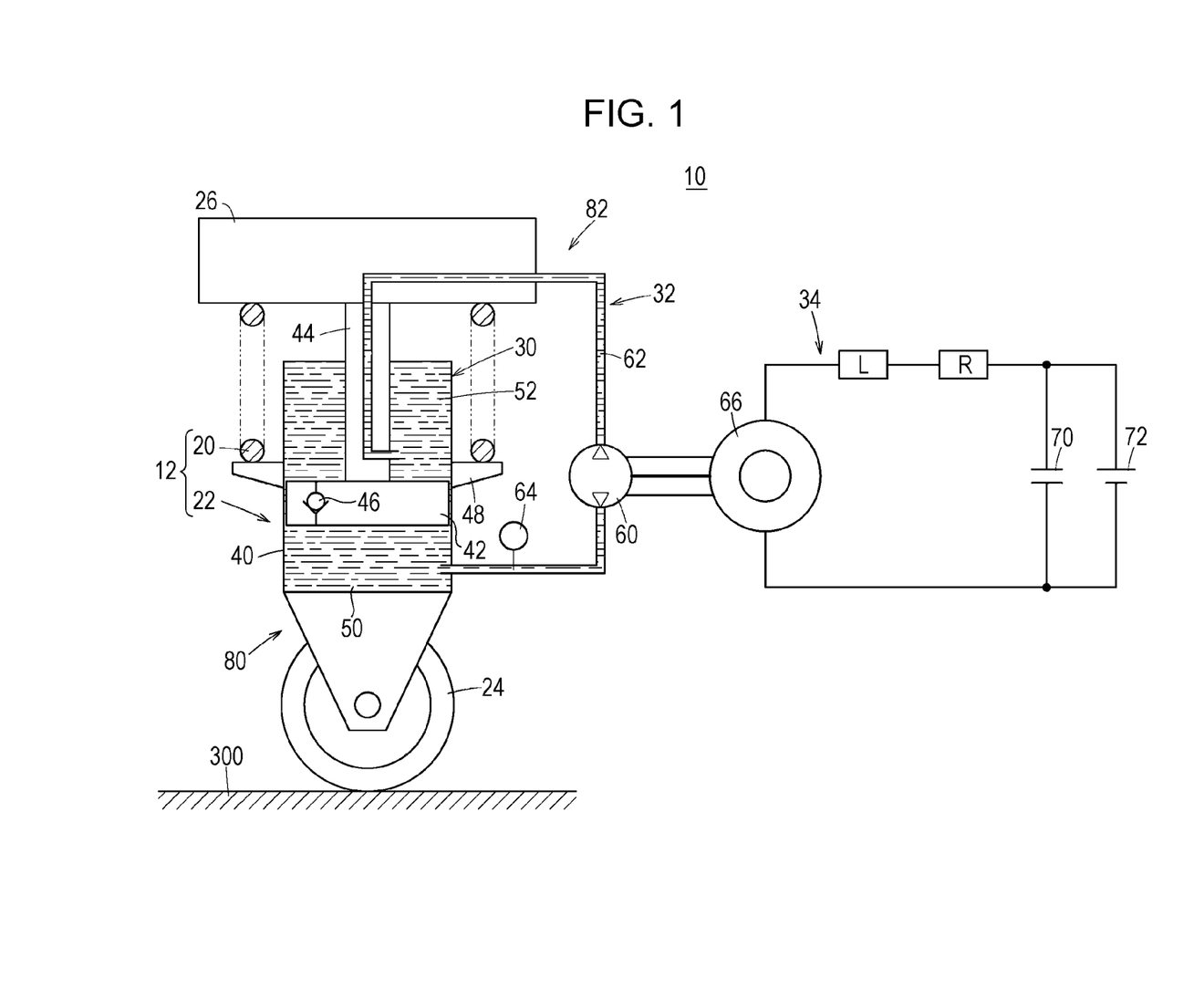
FIG. 1 is an exemplary schematic configuration diagram simply illustrating part of a vehicle in which a suspension apparatus including a damper according to an embodiment of the present disclosure is mounted.

[A1. Configuration of Vehicle 10]
(A1-1. Entire Configuration of Vehicle 10)
FIG. 1 is an exemplary schematic configuration diagram simply illustrating part of a vehicle 10 in which a suspension apparatus 12 including a damper 22 according to an embodiment of the present disclosure is mounted. The suspension apparatus 12 includes a coil spring 20 corresponding to each wheel 24 and the damper 22.
(A1-2. Coil Spring 20)
The coil spring 20 is disposed between a vehicle body 26 and a spring seat 48. The coil spring 20 absorbs oscillation (road surface oscillation) input from a road surface 300 to the wheel 24.
(A1-3. Damper 22)
(A1-3-1. Entire Configuration of Damper 22)
The damper 22 damps displacement of the coil spring 20 (or the vehicle body 26). As illustrated in FIG. 1, the damper 22 includes a damper body 30, a hydraulic mechanism 32, and a motor circuit 34.
(A1-3-2. Damper Body 30)
The damper body 30 includes a hydraulic cylinder 40, a piston head 42, a piston rod 44, and a piston valve 46, in addition to the spring seat 48. The hydraulic cylinder 40 is a cylindrical member. The interior of the hydraulic cylinder 40 is divided into a first hydraulic chamber 50 (hereinafter also referred to as a "first fluid chamber 50") and a second hydraulic chamber 52 (hereinafter also referred to as a "second fluid chamber 52") with the piston head 42. The first hydraulic chamber 50 and the second hydraulic chamber 52 are filled with oil. One end of the piston rod 44 is fixed to the piston head 42 having a diameter substantially equal to that of the inner periphery of the hydraulic cylinder 40 and the other end of the piston rod 44 is fixed to the vehicle body 26. The piston valve 46 is provided in the piston head 42. The first hydraulic chamber 50 communicates with the second hydraulic chamber 52 via the piston valve 46. The spring seat 48 is provided along the outer periphery of the hydraulic cylinder 40 and supports one end of the coil spring 20. The above configuration causes the damper body 30 to function as an actuator.

(A1-3-3. Hydraulic Mechanism 32)

The hydraulic mechanism 32 controls circulation of the oil in the damper 22. The hydraulic mechanism 32 includes a hydraulic pump 60, an oil path 62, an accumulator 64, and an electromagnetic motor 66 (hereinafter also referred to as a "motor 66"). The motor 66 generates damping force Fd to the coil spring 20 by regenerating the energy of input oscillation input into the damper body 30. Although the motor 66 in the present embodiment is a direct current (DC) motor, the motor 66 may be an alternating current (AC) motor.

(A1-3-4. Motor Circuit 34)

The motor circuit 34 is electrically connected to the motor 66. The motor circuit 34 includes a capacitor 70 (a first electrical storage unit) and a battery 72 (a second electrical storage unit or an electrical load). An inductance L of the motor 66 and a resistance R of the motor 66 are also illustrated in the motor circuit 34 in FIG. 1. A combination of the motor 66 and the motor circuit 34 allows motor reaction force Fmr (in other words, the damping force Fd to the coil spring 20) to be generated with counter electromotive force of the motor 66. In addition, power is generated through the regeneration by the motor 66.

The electromagnetic motor 66 is charged with power from the capacitor 70 and the power is used as regeneration power of the electromagnetic motor 66. The capacitor 70 supplies the power to the battery 72 or other electrical equipment (not illustrated) (for example, an audio device, a navigation apparatus, or a display apparatus on an instrument panel). The capacitor 70 in the present embodiment is a polarized capacitor. The electromagnetic motor 66 or the capacitor 70 is charged with power from the battery 72, and the power is used as the regeneration power of the electromagnetic motor 66 or discharge power of the capacitor 70. The battery 72 supplies the power to the other electrical equipment.

Since the motor circuit 34 has the simple configuration, the reliability of the operation of the motor circuit 34 is high.

[A2. Operation of Damper 22]

Figure 2:
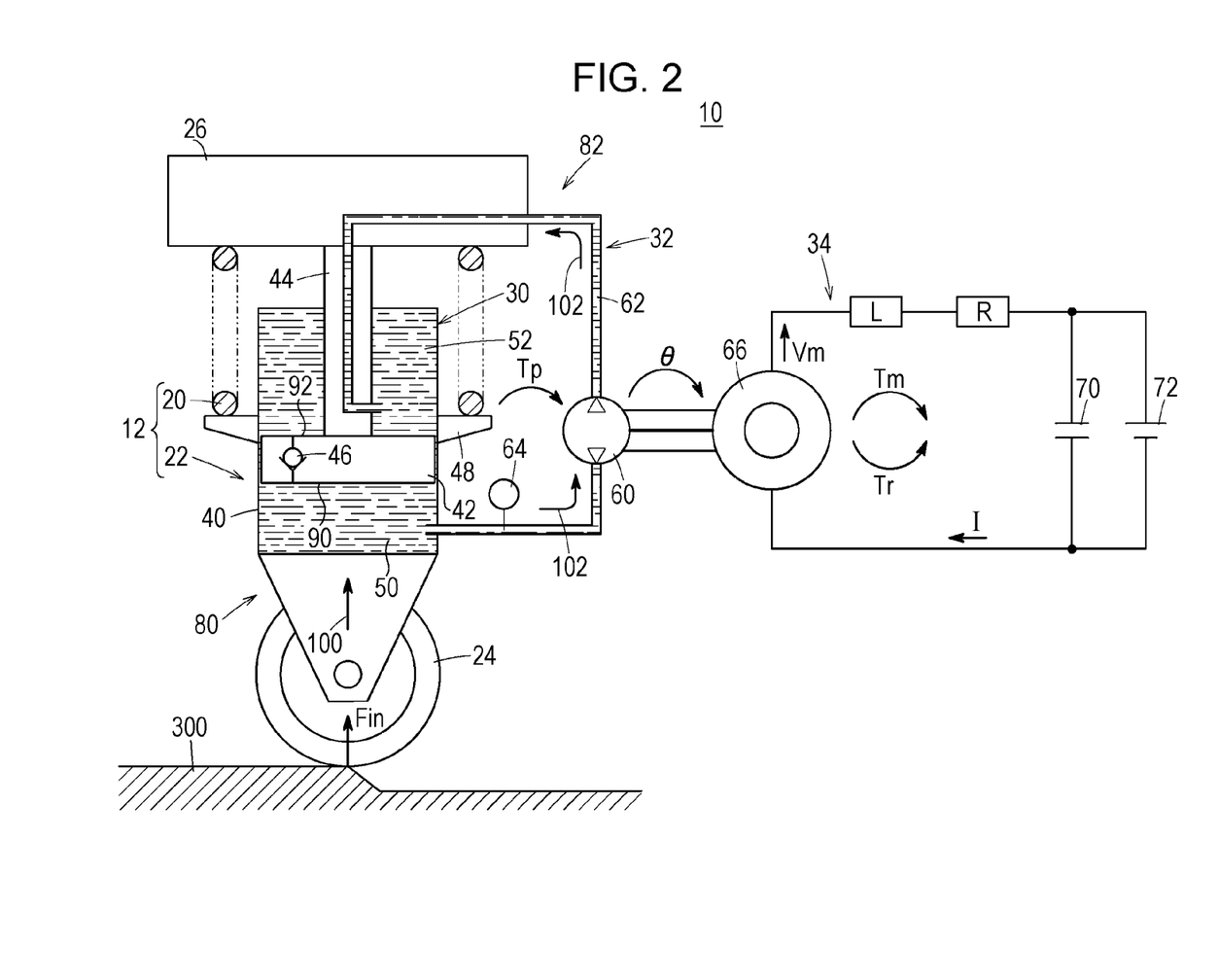
FIG. 2 illustrates an exemplary state when unsprung members come close to sprung members in the present embodiment.
Figure 3:
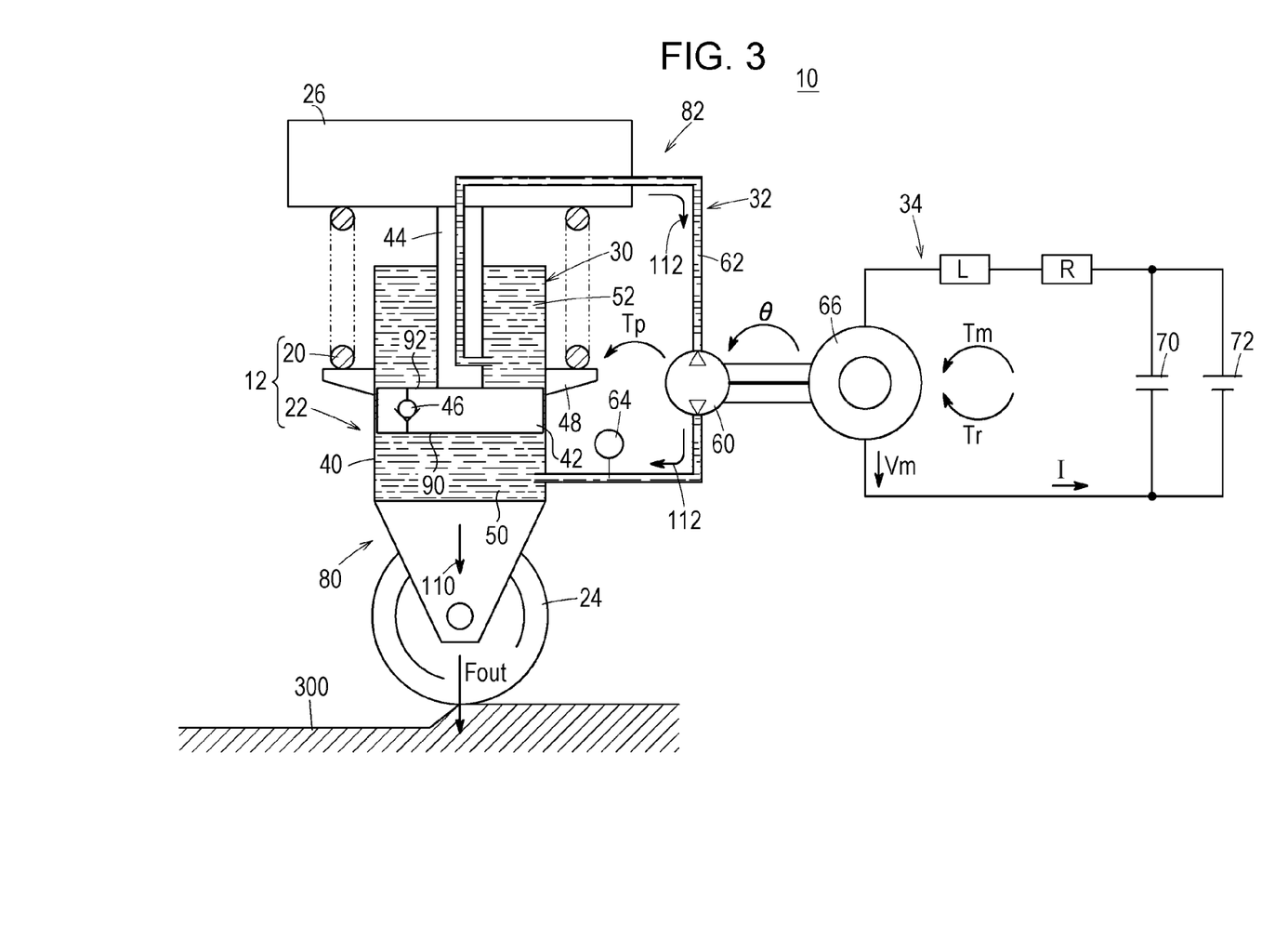
FIG. 3 illustrates an exemplary state when the unsprung members are apart from the sprung members in the present embodiment.

FIG. 2 illustrates an exemplary state when unsprung members 80 come close to sprung members 82 in the present embodiment. FIG. 3 illustrates an exemplary state when the unsprung members 80 are apart from the sprung members 82 in the present embodiment.

As illustrated in FIG. 2, the unsprung members 80 (the wheel 24, the hydraulic cylinder 40, and so on) come close to the sprung members 82 (the vehicle body 26, the piston head 42, the piston rod 44, and so on) upon reception of road surface input Fin from the road surface 300 (refer to an arrow 100). In this case, the pressure is mainly exerted on a bottom face 90 of the piston head 42. Accordingly, the oil in the hydraulic mechanism 32 (the oil path 62 and so on) flows in the direction illustrated by an arrow 102.

In response to flow of the oil, torque Tp is produced around a rotatable shaft of the hydraulic pump 60. The rotatable shaft of the hydraulic pump 60 is linked to a rotatable shaft of the electromagnetic motor 66 (this is simply illustrated in FIG. 1). Accordingly, the torque Tp (output torque) from the rotatable shaft of the hydraulic pump 60 is input into the rotatable shaft of the motor 66. Torque (input torque) produced in the motor 66 is hereinafter referred to as torque Tm or input torque Tm.

Upon rotation of the motor 66 in response to the input torque Tm to the motor 66, the motor 66 generates power corresponding to the input torque Tm (in other words, regenerates the energy of input oscillation). Voltage Vm is generated in the motor circuit 34 and current I flows through the motor circuit 34. In the generation of the power corresponding to the input torque Tm by the motor 66, the counter electromotive force is generated and reaction force Tr is generated around the rotatable shaft of the motor 66. Upon generation of the reaction force Tr around the rotatable shaft of the hydraulic pump 60, the reaction force Tr acts as reaction force against force (refer to the arrow 102) exerted on the oil in association with the road surface input Fin. In association with the reaction force, the damping force Fd to the coil spring 20 is generated in the unsprung members 80 (the wheel 24, the hydraulic cylinder 40, and so on). This allows the oscillation of the coil spring 20 to be damped.

In contrast, as illustrated in FIG. 3, the unsprung members 80 (the wheel 24, the hydraulic cylinder 40, and so on) are apart from the sprung members 82 (the vehicle body 26, the piston head 42, the piston rod 44, and so on) upon reception of road surface input Fout from the road surface 300 (refer to an arrow 110). In this case, the pressure is mainly exerted on an upper face 92 of the piston head 42. Accordingly, the oil in the hydraulic mechanism 32 (the oil path 62 and so on) flows in the direction illustrated by an arrow 112. In association with the flow of the oil in the direction illustrated by the arrow 112, the hydraulic pump 60 and the motor 66 operate in a direction opposite to that in FIG. 2. As a result, the direction of the voltage Vm and the current I in the motor 66 is opposite to that in FIG. 2.

[A3. Damping Characteristics of Damper 22]

Damping characteristics of the damper 22 of the present embodiment will now be described. The present embodiment is characterized in that an electrical resonant frequency ωm is set in consideration of the negative spring effect and in that the damper 22 (the hydraulic mechanism 32) has a configuration to use the polarized capacitor 70. The electrical resonant frequency ωm (hereinafter also referred to as a "resonant frequency ωm") is identified by the inductance L of the motor 66 and a capacitance C of the capacitor 70. Specifically, the electrical resonant frequency ωm is equal to $1/\{2\sqrt{(L \cdot C)}\}$. The characteristics are described in detail below.

(A3-1. Definition)

Figure 4:
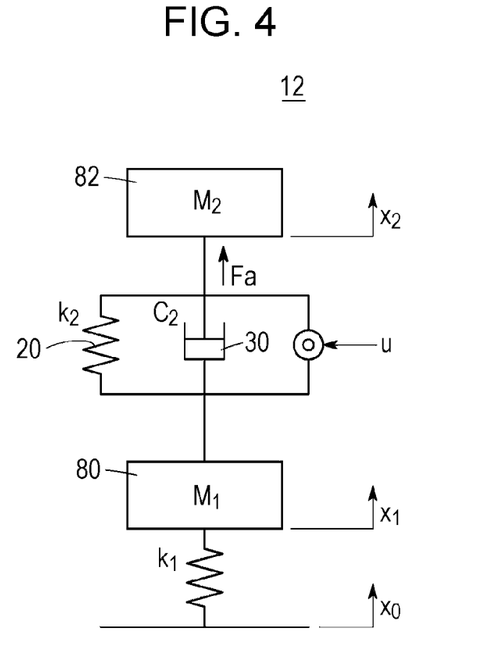
FIG. 4 illustrates an equivalent model for describing the operation of the suspension apparatus in the present embodiment.

FIG. 4 illustrates an equivalent model for describing the operation of the suspension apparatus 12 in the present embodiment. Reference letters and numerals in FIG. 4 denote the following values:

$x_0$: Amount of vertical displacement of road surface 300 [m]

$x_1$: Amount of vertical displacement of unsprung members 80 [m]

$x_2$: Amount of vertical displacement of sprung members 82 [m]

$M_1$: Mass of unsprung members 80 [kg]

$M_2$: Mass of sprung members 82 [kg]

$k_1$: Spring constant of unsprung members 80 [N/m]

$k_2$: Spring constant of coil spring 20 [N/m]

$C_2$: Damping coefficient of damper body 30 [N/m/s]

u: Amount of control of motor 66

The unsprung members 80 include, for example, the wheel 24 and the hydraulic cylinder 40. The sprung members 82 include, for example, the vehicle body 26, the piston head 42, and the piston rod 44. The amount of control u of the motor 66 in the present embodiment is indicated by, for example, regeneration energy.

(A3-2. Force Fa Generated in Damper Body 30 (Actuator) (Negative Spring Effect))
(A3-2-1. Theoretical Description)

The negative spring effect will now be described with reference to the force Fa generated in the damper body 30 (actuator).

The following relationship is established in the damper 22 of the present embodiment:

$$Fa = \lambda \cdot Tp \quad (1)$$

$$\lambda = \theta/(x_2 - x_1) \quad (2)$$

$$Imp \cdot \theta'' = Tm - Tp \quad (3)$$

$$L \cdot I'' + R \cdot I' + I/C + Vm' = 0 \quad (4)$$

$$Tm = Ke \cdot I \quad (5)$$

$$Vm = Ke \cdot \theta' \quad (6)$$

Reference numerals and letters in Equations (1) to (6) denote the following values:

C: Capacitance of capacitor 70 [F]
Fa: Force generated in damper body 30 (actuator) [N]
I: Current flowing through motor circuit 34 [A]
I': Speed of current flowing through motor circuit 34 [A/s]
I": Acceleration of current flowing through motor circuit 34 [A/s/s]
Imp: Moment of inertia of hydraulic pump 60 and motor 66 [kg·m$^2$]
Ke: Induced voltage constant of motor 66 (=torque constant of motor 66)
L: Inductance of motor 66 [Q]
R: Resistance of motor 66 [Q]
Tm: Torque of motor 66 [N·m]
Tp: Torque of hydraulic pump 60 [N·m]
Vm: Output voltage from motor 66 (motor voltage) [V]
Vm': Time differential value of motor voltage Vm [V]
$x_1$: Amount of vertical displacement of unsprung members 80 [m]
$x_2$: Amount of vertical displacement of sprung members 82 [m]
$\lambda$: Equivalent gear ratio
$\theta$: Angle of rotation of rotatable shaft of motor 66 [deg]
$\theta'$: Rotational speed of rotatable shaft of motor 66 [deg/s]
$\theta''$: Rotational acceleration of rotatable shaft of motor 66 [deg/s/s]

Laplace transformation of Equations (1) to (6) results in representation of the force Fa generated in the damper body 30 (actuator) according to Equation (7):

$$Fa = -\lambda^2 \cdot Imp(x_2'' - x_1'') - \frac{\lambda^2 \cdot Ke^2 \cdot s}{L \cdot s^2 + R \cdot s + (1/C)}(x_2' - x_1') \quad (7)$$

"$-\lambda^2 \cdot Imp(x_2''-x_1'')$", which is the first term of the right-hand side of Equation (7), indicates the negative spring effect. In other words, since the unsprung members 80 repeats vertical movement with respect to the sprung members 82, the positional relationship between the unsprung members 80 and the sprung members 82 is capable of being approximated with a trigonometric function. Accordingly, "$\lambda^2 \cdot Imp(x_2''-x_1'')$" may be equivalent to "$K(x_2-x_1)$" (K denotes a spring constant). In addition, the first term of the right-hand side of Equation (7) includes "−". Accordingly, the first term of the right-hand side of Equation (7) means force opposite to that of the coil spring 20. As a result, the first term of the right-hand side of Equation (7) has an effect of suppressing the oscillation at a sprung resonant frequency ω2 or around the sprung resonant frequency ω2.

"$-\lambda^2 \cdot Ke^2 \cdot s/\{L \cdot s^2 + R \cdot s + (1/C)\} \cdot (x_2'-x_1')$", which is the second term of the right-hand side of Equation (7), indicates the damping force generated in the damper body 30 (actuator).

Representing Equation (7) in the form of a transfer function $Fa/(x_2'-x_1')$ results in Equation (8):

$$\frac{Fa}{(x_2' - x_1')} = -\lambda^2 \cdot Imp \cdot s \left[ \frac{L \cdot s^2 + R \cdot s + \{(1/C) + Ke^2/(Imp)\}}{L \cdot s^2 + R \cdot s + (1/C)} \right] \quad (8)$$

As described above, the force Fa generated in the damper body 30 (actuator) causes the negative spring effect at the sprung resonant frequency ω2 or around the sprung resonant frequency ω2. Accordingly, setting the electrical resonant frequency ωm of the motor 66 and the motor circuit 34 on the basis of an unsprung resonant frequency ω1 allows a damping effect to be effectively achieved for both the sprung and the unsprung.

(A3-2-2. Example of Transfer Function G)

An example will now be described in which the electrical resonant frequency ωm of the motor 66 and the motor circuit 34 is set on the basis of the unsprung resonant frequency ω1 in consideration of the negative spring effect, while comparing the example with a comparative example.

Figure 5A:
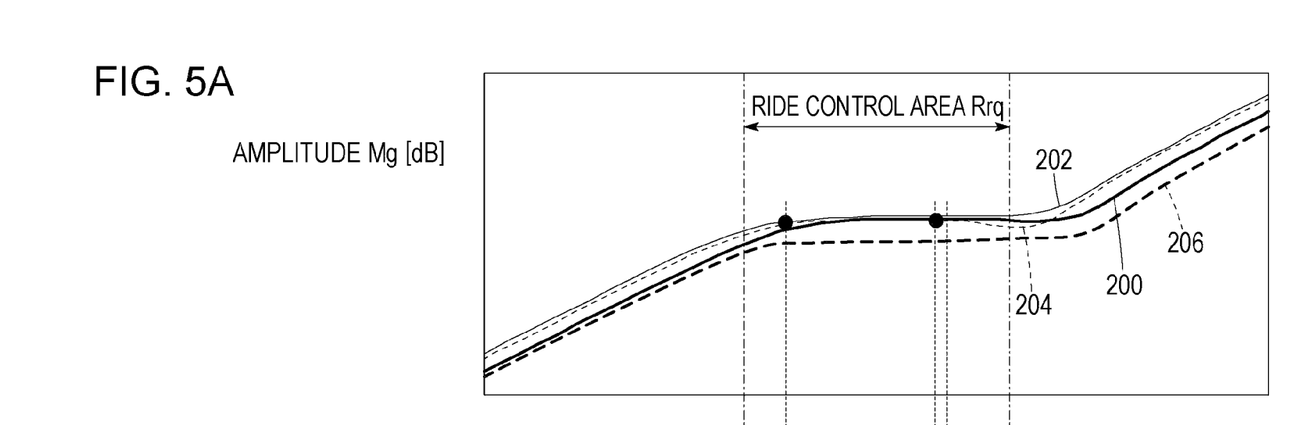
FIG. 5A is a graph illustrating an example of the relationship between a frequency and an amplitude for a transfer function for each electrical resonant frequency identified by the inductance of an electromagnetic motor and the capacitance of a capacitor and FIG. 5B is a graph illustrating an example of the relationship between the frequency and a phase for the transfer function for each electrical resonant frequency.
Figure 5B:
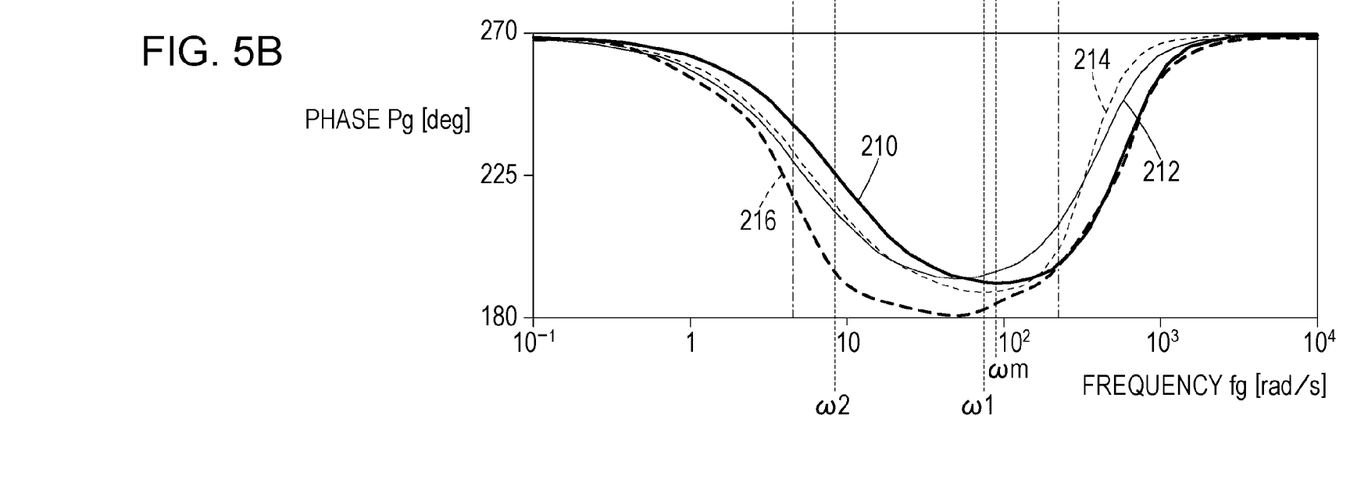

FIG. 5A is a graph illustrating an example of the relationship between a frequency fg and an amplitude Mg for a transfer function G for each electrical resonant frequency ωm identified by the inductance L of the motor 66 and the capacitance C of the capacitor 70. FIG. 5B is a graph illustrating an example of the relationship between the frequency fg and a phase Pg for the transfer function G for each electrical resonant frequency ωm. The graphs in FIG. 5A and FIG. 5B compose a Bode diagram indicating frequency characteristics of the damper 22 of the present embodiment.

Referring to FIG. 5A and FIG. 5B, lines 200 and 210 illustrate a first example in which the resonant frequency ωm is set to a value (81.6 [rad/s] in the present embodiment) about 6.5% higher than the unsprung resonant frequency ω1 (76.6 [rad/s] in the present embodiment). Lines 202 and 212 illustrate a second example in which the resonant frequency ωm is made equal to the unsprung resonant frequency ω1. Lines 204 and 214 illustrate a third example in which the resonant frequency ωm is set to a value (63.2 [rad/s] in the present embodiment) about 17.5% lower than the unsprung resonant frequency ω1. Lines 206 and 216 illustrate a comparative example in which the resonant frequency ωm is set to a value (53.6 [rad/s] in the present embodiment) about 30.0% lower than the unsprung resonant frequency ω1.

Referring to FIG. 5A and FIG. 5B, although the amplitude Mg is not varied so much in a frequency area Rrq (hereinafter also referred to as a "ride control area Rrq") which affects the ride of an occupant of the vehicle 10 in any of the first example, the second example, the third example, and the comparative example, the phase Pg is varied in the ride control area Rrq.

(A3-2-3. Exemplary Characteristics of Sprung)

Figure 6:
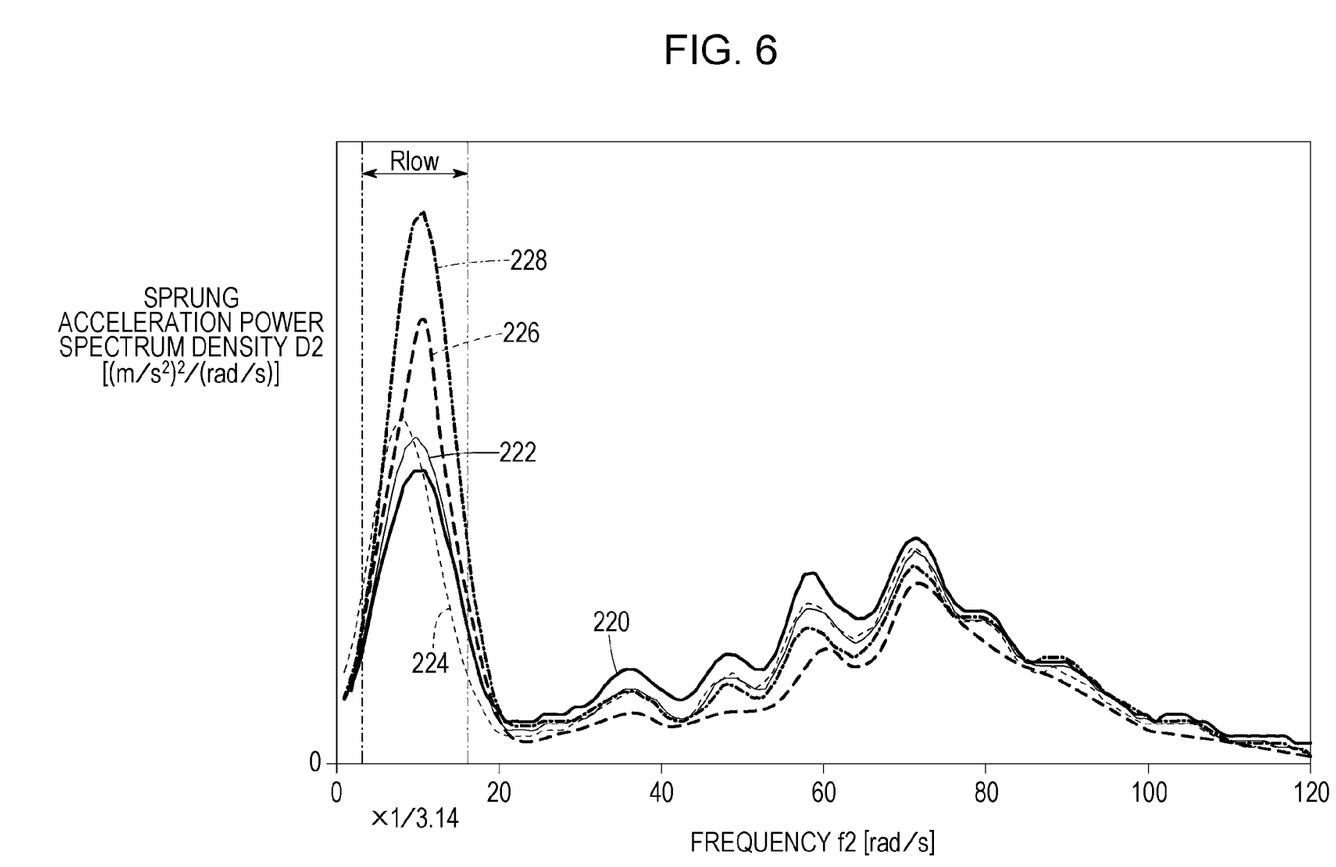
FIG. 6 is a graph illustrating an example of the relationship between a frequency and a power spectrum density at a sprung acceleration for each electrical resonant frequency.

FIG. 6 is a graph illustrating an example of the relationship between a frequency f2 and a power spectrum density D2 at a sprung acceleration $x_2''$ for each electrical resonant frequency ωm. The values of the frequency f2 indicated on the horizontal axis in FIG. 6 result from multiplication of actual values by "1/3.14" in order to make them easier to understand in units of Hz (the same applies to FIG. 7). Referring to FIG. 6, lines 220, 222, 224, 226, and 228 illustrate first to third examples and first and second comparative examples. The first to third examples in FIG. 6 correspond to the first to third examples in FIG. 5A and FIG. 5B. The first comparative example in FIG. 6 corresponds to the comparative example in FIG. 5A and FIG. 5B. In the second comparative example in FIG. 6, active control is performed without LC resonance.

The occupant of the vehicle 10 is generally sensitive to the oscillation in a relatively low frequency area (for example, 3 to 8 Hz). As apparent from FIG. 6, in a relatively low frequency area Rlow, the power spectrum density D2 tends to be decreased as the resonant frequency ωm comes close to the unsprung resonant frequency ω1. This means that the damping effect of the sprung tends to be increased as the resonant frequency ωm comes close to the unsprung resonant frequency ω1.

(A3-2-4. Exemplary Unsprung Characteristics)

Figure 7:
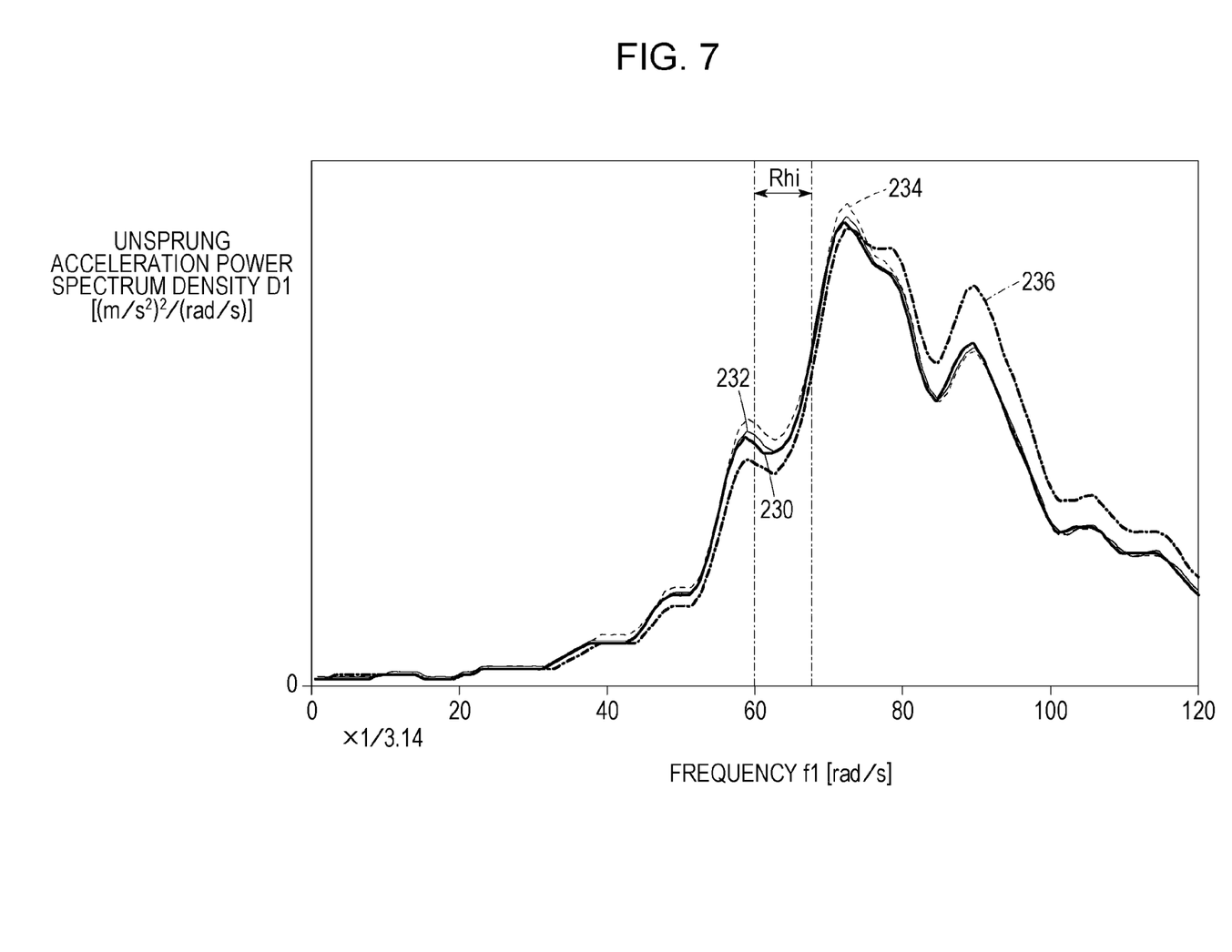
FIG. 7 is a graph illustrating an example of the relationship between a frequency and a power spectrum density at an unsprung acceleration for each electrical resonant frequency.

FIG. 7 is a graph illustrating an example of the relationship between a frequency f1 and a power spectrum density D1 at an unsprung acceleration $x_1''$ for each electrical resonant frequency ωm. Referring to FIG. 7, lines 230, 232, 234, and 236 illustrate first and second examples and first and second comparative examples, as in FIG. 6 (the third example is omitted in FIG. 7). The first and second examples and the first and second comparative examples in FIG. 7 correspond to the first and second examples and the first and second comparative examples in FIG. 6.

The driving stability of the vehicle 10 is generally affected by the unsprung acceleration $x_1''$. As apparent from FIG. 7, in a relatively high frequency area Rhi, the substantially equal power spectrum density D1 is achieved in any of the first and second examples and the first and second comparative examples. Accordingly, it is possible to realize similar driving stability in any of the first and second examples and the first and second comparative examples.

(A3-3. Configuration Capable of Using Polarized Capacitor 70)

(A3-3-1. Premise)

It is necessary to cause the LC resonance in the motor circuit 34 by normal rotation or reverse rotation of the motor 66 caused by the upward and downward motion involved in the road surface input Fin and the road surface input Fout (refer to FIG. 2 and FIG. 3) with the view of generating the negative spring effect described above. When the LC resonance is caused in the motor circuit 34, the output voltage Vm from the motor 66 is continuously switched between positive values and negative values. When the polarized capacitor 70 is used, the durability of the capacitor 70 may possibly be reduced.

In order to resolve this problem, a non-polarized capacitor may be used as the capacitor 70. However, since the existing non-polarized capacitors are relatively increased in size, the existing non-polarized capacitors are often not suitable for mounting in, for example, the vehicle 10.

Accordingly, in the present embodiment, the damper 22 (the hydraulic mechanism 32) is configured so as to decrease the probability of reducing the durability of the capacitor 70 even when the polarized capacitor 70 is used.

(A3-3-2. Specific Content)

A configuration is used in the present embodiment in which the amount of power generated in the normal rotation of the motor 66 is made different from the amount of power generated in the reverse rotation of the motor 66 in order to decrease the probability of reducing the durability of the capacitor 70 even when the polarized capacitor 70 is used.

The piston head 42 included in the sprung members 82 comes close to the unsprung members 80 when the unsprung members 80 come close to the sprung members 82, as illustrated in FIG. 2. In this case, the pressure is mainly exerted on the bottom face 90 of the piston head 42.

In contrast, the piston head 42 included in the sprung members 82 is apart from the unsprung members 80 when the unsprung members 80 are apart from the sprung members 82, as illustrated in FIG. 3. In this case, the pressure is mainly exerted on the upper face 92 of the piston head 42.

As apparent from FIG. 2 and FIG. 3, the piston rod 44 is fixed to the vehicle body 26 side and is included in the sprung members 82 in the present embodiment. Accordingly, a surface area Aup of the upper face 92 is smaller than a surface area Alow of the bottom face 90. Consequently, the amount of change in angle of rotation θ of the rotatable shaft of the motor 66 or the equivalent gear ratio $\lambda\{=\theta/(x2-x1)\}$ when the unsprung members 80 come close to the sprung members 82 (FIG. 2) is different from that when the unsprung members 80 are apart from the sprung members 82 (FIG. 3). Specifically, the amount of change in angle of rotation θ and the equivalent gear ratio λ when the unsprung members 80 come close to the sprung members 82 are greater than those when the unsprung members 80 are apart from the sprung members 82.

When the equivalent gear ratio λ when the unsprung members 80 come close to the sprung members 82 is different from that when the unsprung members 80 are apart from the sprung members 82, the regeneration power of the motor 66 when the unsprung members 80 come close to the sprung members 82 is also different from that when the unsprung members 80 are apart from the sprung members 82. Accordingly, the voltage (hereinafter referred to as "capacitor voltage Vc") of the capacitor 70 is polarized. Consequently, it is possible to decrease the probability of reducing the durability of the capacitor 70 even when the polarized capacitor 70 is used.

(A3-3-3. Example of Variation in Voltage of Capacitor 70)

Figure 8:
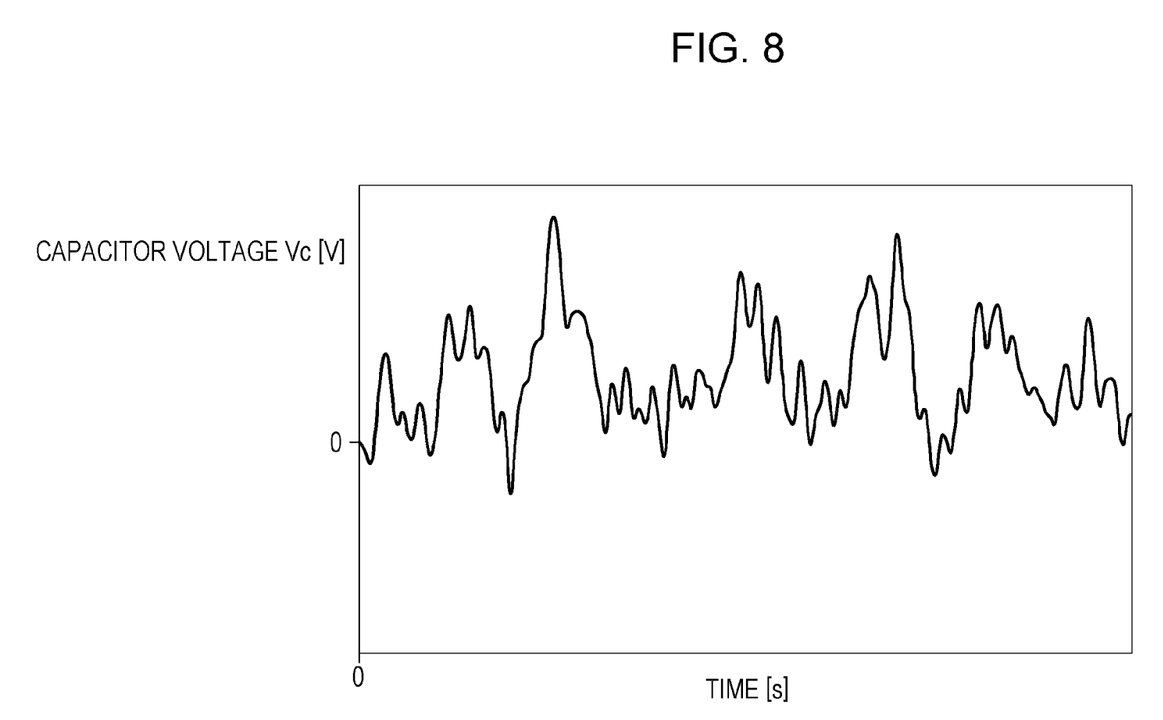
FIG. 8 is a time chart illustrating an example of how the voltage of the capacitor is varied in the present embodiment.

FIG. 8 is a time chart illustrating an example of how the voltage of the capacitor 70 (the capacitor voltage Vc) is varied in the present embodiment. FIG. 8 indicates that the capacitor voltage Vc is subjected to positive deviation.

[A4. Advantages of Present Embodiment]

As described above, according to the present embodiment, in the piston head 42, the surface area Alow of the first fluid chamber 50 side at which the piston rod 44 does not exist is different from the surface area Aup of the second fluid chamber 52 side at t which the piston rod 44 exists (refer to FIG. 2). Accordingly, the relationship between the amount of displacement of the piston head 42 and the amount of change in the angle of rotation θ of the motor 66 is capable of being varied in accordance with the direction in which the piston head 42 is displaced.

Specifically, when the piston head 42 is displaced toward the first fluid chamber 50 side (FIG. 2), the amount of change in the angle of rotation θ of the motor 66 (the rotational speed of the motor 66) with respect to the amount of displacement of the piston head 42 is capable of being increased. When the piston head 42 is displaced toward the second hydraulic chamber 52 side (FIG. 3), the amount of change in the angle of rotation θ of the motor 66 (the rotational speed of the motor 66) with respect to the amount of displacement of the piston head 42 is capable of being decreased. Accordingly, when the piston head 42 moves in the hydraulic cylinder 40, the amount of power generation when the piston head 42 is displaced toward the first fluid chamber 50 side is capable of being increased to cause the positive deviation of the capacitor voltage Vc. As a result, it is possible to easily suppress deterioration of the capacitor 70 even when the polarized capacitor 70 is used.

The inductance L of the motor 66 and the capacitance C of the capacitor 70 composes an LC resonant circuit in the present embodiment (FIG. 1). This allows the polarized capacitor 70 to be protected because of the above action even when the LC resonant circuit is configured.

The electrical resonant frequency ωm identified by the inductance L of the motor 66 and the capacitance C of the capacitor 70 is set to a value within ±20% of the unsprung resonant frequency ω1 in the present embodiment (refer to the first to third examples in FIG. 5 to FIG. 7). This passively suppresses the input oscillation components corresponding to the sprung resonant frequency ω2, in addition to the input oscillation components corresponding to the unsprung resonant frequency ω1 (refer to FIG. 6 and FIG. 7). Accordingly, it is possible to suppress the input oscillation components corresponding to the unsprung resonant frequency ω1 and the sprung resonant frequency ω2 without the active control of the motor 66.

Specifically, the inventor of the present disclosure has found that the force Fa generated in the damper body 30 (actuator) includes the effect (the negative spring effect) to reduce the input oscillation components corresponding to the sprung resonant frequency ω2 when the electrical resonant frequency ωm is set to the unsprung resonant frequency ω1 or a value near the unsprung resonant frequency ω1 (for example, a value within ±20% of the unsprung resonant frequency ω1). Accordingly, the input oscillation components corresponding to the unsprung resonant frequency ω1 and the sprung resonant frequency ω2 are suppressed without the active control of the input oscillation corresponding to the sprung resonant frequency ω2 by the motor 66, unlike Japanese Unexamined Patent Application Publication No. 2004-237824, the entire contents of which are incorporated herein by reference. Consequently, it is possible to improve the energy usage efficiency without consuming the power to suppress the input oscillation corresponding to the sprung resonant frequency ω2, rather by accumulating the power through the regeneration.

The battery 72 (electrical load) is connected to the capacitor 70 in the present embodiment (FIG. 1). This allows the power charged in the capacitor 70 to be discharged even when the motor circuit 34 is configured so that the capacitor voltage Vc is subjected to the positive deviation. Accordingly, the capacitor 70 is hard to be in a full-charge state, thereby easily keeping the performance of the damper 22.

The suspension apparatus 12 including the damper 22 described above is mounted in the vehicle 10 in the present embodiment (FIG. 1). Accordingly, it is possible to realize excellent damping performance without consuming the power of the vehicle 10 for the damper 22.

B. Modifications

The present disclosure is not limited to the above embodiment and various configurations may be adopted on the basis of the content of the description in this specification. For example, the following configurations may be adopted.

[B1. Scope]

The example is described in the above embodiment in which the suspension apparatus 12 or the damper 22 is applied to the vehicle 10 (FIG. 1). However, the present disclosure is not limited to the above embodiment, for example, in terms of the negative spring effect or the use of the polarized capacitor 70. For example, the suspension apparatus 12 or the damper 22 may be applied to another apparatus (for example, a ship, an airplane, an elevator, a measuring apparatus, or a manufacturing apparatus).

[B2. Suspension Apparatus 12]

(B2-1. Coil Spring 20)

The coil spring 20 is used as the spring to absorb the road surface oscillation (input oscillation) in the above embodiment. However, a spring of another kind (for example, a plate spring) may be used, for example, in terms of the absorption of the road surface oscillation (input oscillation).

(B2-2. Damper 22)

The damper 22 including the hydraulic mechanism 32 is used in the above embodiment (FIG. 1). However, the present disclosure is not limited to the use of the damper 22, for example, in terms of the negative spring effect or the polarized capacitor 70. For example, a ball screw configuration, a rack-and-pinion configuration, or a direct configuration (linear motor) may be used. When the polarized capacitor 70 is used in the damper 22 that does not include the hydraulic mechanism 32, a configuration in which the equivalent gear ratio λ in the normal rotation of the motor 66 is made different from that in the reverse rotation of the motor 66 (for example, a configuration in which a one-way clutch is disposed on the rotatable shaft of the motor 66 or another rotatable shaft linked to the rotatable shaft of the motor 66) may be used.

The piston rod 44 is disposed at the vehicle body 26 side in the above embodiment (for example, FIG. 1). However, the present disclosure is not limited to this configuration, for example, in terms of the negative spring effect or the polarized capacitor 70. The piston rod 44 may be disposed at the wheel 24 side.

(B2-3. Hydraulic Mechanism 32)

The damping force Fd generated by the motor 66 is transferred using the oil in the above embodiment (FIG. 2 and FIG. 3). However, another fluid (for example, air) other than the oil may be used, for example, in terms of the transfer of the damping force Fd generated by the motor 66.

(B2-4. Electromagnetic Motor 66)

The DC motor 66 is used in the above embodiment. However, the present disclosure is not limited to the DC motor 66, for example, in terms of the negative spring effect or the control of the polarized capacitor 70. For example, an AC motor may be used as the motor 66.

Figure 9:
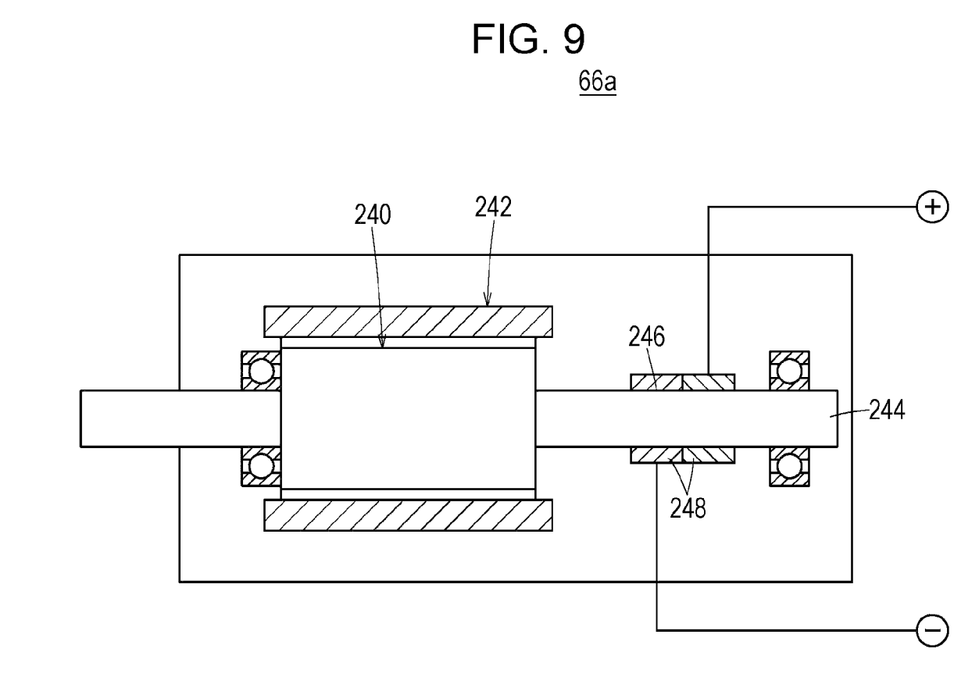
FIG. 9 is a cross-sectional view simply illustrating an exemplary configuration of an electromagnetic motor according to a modification.

FIG. 9 is a cross-sectional view simply illustrating an exemplary configuration of an electromagnetic motor 66a (hereinafter also referred to as a "motor 66a") according to a modification. The motor 66a is a single-phase AC commutator motor. As illustrated in FIG. 9, the motor 66a includes a rotor 240 and a stator 242. A commutator 246 on a rotatable shaft 244 of the rotor 240 is in contact with a brush 248 of the stator 242. The commutator 246 and the brush 248 are composed of slip rings in the present modification.

The use of the single-phase AC commutator motor 66a illustrated in FIG. 9 has the following advantages. Specifically, the moment of inertia is considerably reduced in the single-phase AC commutator motor 66a, compared with common DC motors having an iron core in the rotor 240. Accordingly, when the damper 22 including the motor 66a in FIG. 9 is used in the suspension apparatus 12 in the vehicle 10, it is possible to prevent deterioration of ride upon occurrence of high-frequency road surface oscillation.

(B2-5. Capacitor 70)

The capacitance C is selected so that the electrical resonant frequency ωm identified by the inductance L of the motor 66 and the capacitance C of the capacitor 70 is set to a value within ±20% of the unsprung resonant frequency ω1 in the present embodiment. However, the present disclosure is not limited to the above configuration, for example, in terms of the negative spring effect or the polarized capacitor 70. For example, an inductance may be provided, in addition to the inductance L of the motor 66, to set the electrical resonant frequency ωm to a value within ±20% of the unsprung resonant frequency ω1.

The polarized capacitor 70 is used in the above embodiment. However, a non-polarized capacitor may be used as the capacitor 70, for example, in terms of the application of the damper 22 or the negative spring effect.

(B2-6. Battery 72)

The battery 72 is connected to the capacitor 70 and the battery 72 is charged with the power of the capacitor 70 in the above embodiment. However, the present disclosure is not limited to the above configuration, for example, in terms of the negative spring effect or the polarized capacitor 70. For example, other electrical equipment (for example, an audio device, a navigation apparatus, or a display apparatus on an instrument panel) may be connected to the capacitor 70, instead of the battery 72. Alternatively, the battery 72 may be omitted.

[B3. Negative Spring Effect]

The electrical resonant frequency ωm is set in consideration of the negative spring effect in the above embodiment. However, the present disclosure is not limited to the above configuration, for example, in terms of the use of the polarized capacitor 70. For example, the polarized capacitor 70 may be applied to a configuration in which the electrical resonant frequency ωm is set in accordance with the sprung resonant frequency ω2 or a value near the sprung resonant frequency ω2. Alternatively, the polarized capacitor 70 may be used in order to use the LC resonance, such as the one described in Japanese Unexamined Patent Application Publication No. 2004-237824, the entire contents of which are incorporated herein by reference, for damping at the unsprung resonant frequency ω1 or within a range around the unsprung resonant frequency ω1.

What is claimed is:

1. A damper comprising:
 a damper body that includes a piston head and a cylinder into which the piston head is slidably fitted such that the piston head divides an inner space of the cylinder into a first fluid chamber and a second fluid chamber each having a fluid filled therein;
 a piston rod one end of which is fixed to the piston head and which is disposed in at a side of the second fluid chamber such that the piston head has,
 a first surface which is in contact with the fluid in the first fluid chamber, and
 a second surface which is in contact with the fluid in the second fluid chamber and which has surface area different than that of the first surface;
 a spring provided to the damper body so as to generate an oscillation input to the damper;
 a communicating path via which the first fluid chamber is in a fluid communication with the second fluid chamber, the communication path being disposed outside the cylinder and allowing the fluid to flow through the communication path;
 a fluid pump provided to the communicating path;
 an electromagnetic motor operatively connected to the fluid pump so as to receive the oscillation input from the spring and so as to regenerate an energy from the oscillation input and apply the energy as damping force to the spring through the fluid pump; and
 a polarized capacitor having a positive electrode side electrically connected to an electrode of the electromagnetic motor, at which output voltage from the electromagnetic motor is positive when the piston head moves toward a side of the first fluid chamber side and at which the output voltage from the electromagnetic motor is negative when the piston head moves toward a side of the second fluid chamber side.

2. The damper according to claim 1,
 wherein the damper is configured to compose an LC resonant circuit by an inductance of the electromagnetic motor and a capacitance of the capacitor.

3. The damper according to claim 2,
 wherein the damper has a sprung resonant frequency above the spring and an unsprung resonant frequency below the spring, and
 wherein an electrical resonant frequency defined by the inductance of the electromagnetic motor and the capacitance of the capacitor is set to a value within ±20% of the unsprung resonant frequency so as to suppress both an oscillation component to the sprung resonant frequency and an oscillation component to the unsprung resonant frequency.

4. The damper according to claim 1, further comprising an electrical load which is connected to the capacitor.

* * * * *